Sept. 25, 1962     D. C. RICHARDS     3,055,450
COUNTERFLOW DETONATION SYSTEM
Filed Feb. 9, 1959
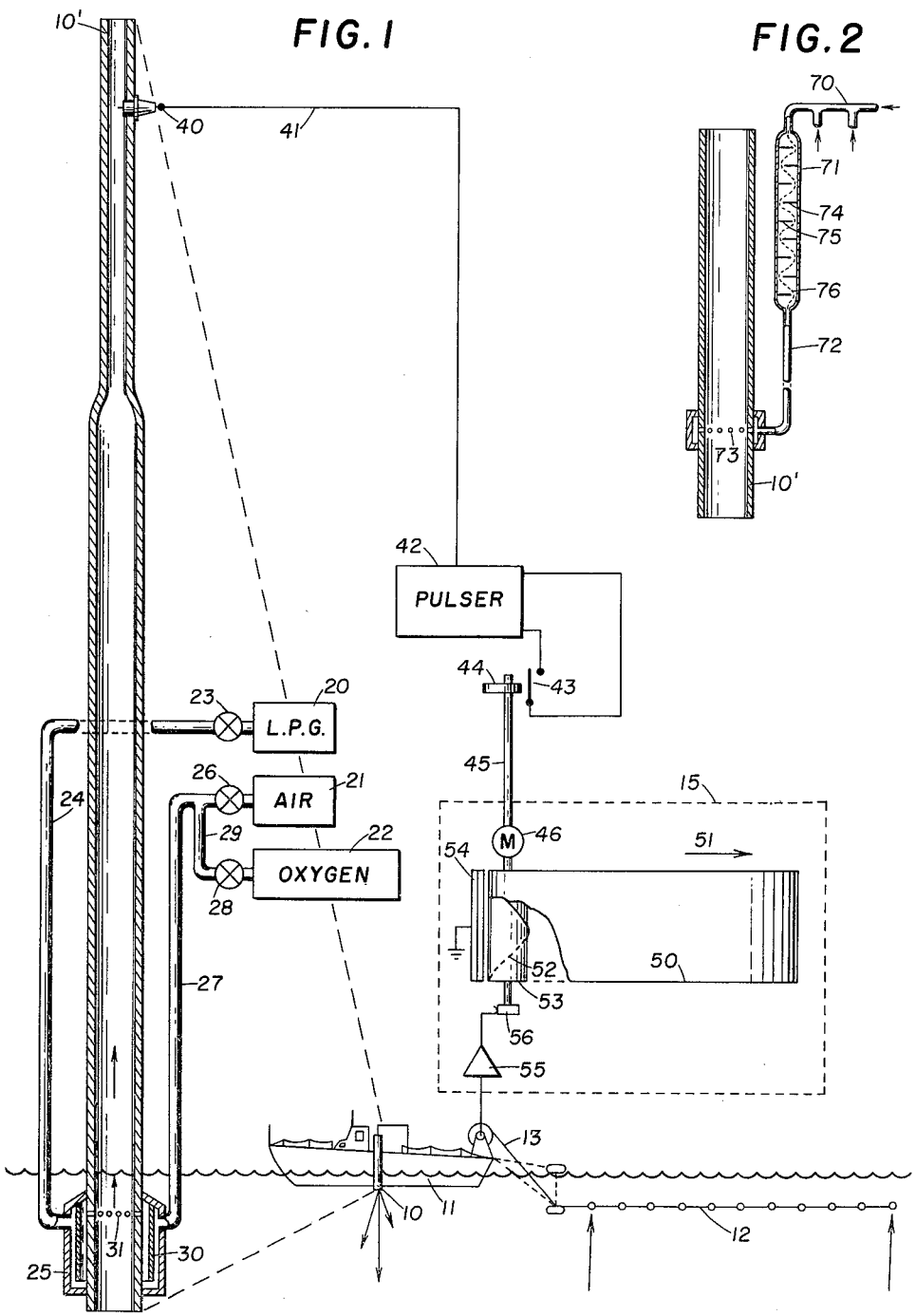

United States Patent Office 3,055,450
Patented Sept. 25, 1962

3,055,450
COUNTERFLOW DETONATION SYSTEM
David C. Richards, Dallas, Tex., assignor, by mesne assignments, to Socony Mobil Oil Company, Inc., a corporation of New York
Filed Feb. 9, 1959, Ser. No. 791,984
5 Claims. (Cl. 181—.5)

This invention relates to a seismic energy source and more particularly to a tube in which gas flow is counter to the direction of travel of the combustion front.

It has been found that repeated ignition of a combustible gas mixture flowing through a vertically oriented pipe may be employed to produce repetitive seismic impulses. With the lower or muzzle end of the pipe or barrel immersed in a water body, waves proceed from the upper end of the barrel toward the muzzle and strike the surface of the water to impart seismic energy thereto. Such a unit may be mounted on a water craft for movement along a given traverse to provide a substantially continuous seismic section or plot portraying the acoustic properties of the subterranean strata. Such a system is disclosed and claimed in application Serial No. 600,804, filed July 30, 1956, now U.S. Patent No. 2,994,397, entitled "Method and System for Continuous Seismic Surveying," of William B. Huckabay, a co-worker of applicant.

In accordance with the present invention there is provided a device for producing seismic impulses which device comprises an elongated tubular member having at least three serially connected zones. These zones include a top combustion zone having an ignition means, an intermediate zone, and a lower immersion zone adapted to be inserted in a body of water or the like. The lower immersion zone has means connected to a fuel source which supplies fuel to the tubular member.

It is desirable that pulses of uniform energy content occurring at precisely controlled time intervals be produced in order to provide high resolution as to the subterranean formations. In accordance with a more specific aspect of the present invention, there is provided an elongated flow channel which is adapted to be positioned vertically with the lower end thereof coupled to the earth. Separate sources of gas components for forming a combustible gas mixture are connected to the tube at a point in the region of the lower end. Means are provided for commingling and mixing said gas components to form a combustible gas mixture. Entry ports are provided in the region of the lower end of the tube through which the gases are introduced for flow upward through the tube and out the upper end thereof. An igniter is positioned in the flow path of said combustible gas mixture in the region of the upper end of said tube for periodically establishing a wave of combustion of said gas which travels at an increasing rate downward through said gas toward detonation velocity to impinge the earth materials adjacent to the lower end thereof. In a preferred embodiment of the invention, the combustible gas components comprise oxygen, air and a liquefied petroleum gas (L.P.G.) such as propane commingled and mixed at the entry ports.

For further objects and advantages of the invention and for a more complete description thereof, reference may now be had to the following description taken in conjunction with the accompanying drawings in which:

FIG. 1 illustrates schematically and in partial cross section a system embodying the present invention; and FIG. 2 illustrates in partial cross section a modification of the invention.

Referring now to FIG. 1, there is illustrated a seismic energy source 10 in the form of an elongated, vertically oriented tube which is supported by a boat 11. Seismic waves produced by source 10 travel downwardly to subsurface reflecting interfaces and back to the surface where such reflected waves are detected in a seismometer spread 12 which is towed behind boat 11. Signals from the spread 12 are applied by way of channel 13 to a seismic recording system 15.

It is desirable that source 10 be operated repetitively at instants uniformly spaced in time so that a record may be produced which is representative of the acoustic characteristics of the earth through which the waves have traveled.

The source 10 suitable for such operation has been shown in substantial enlargement as source 10' in order that details of construction may be clearly shown. The source 10' comprises an elongated barrel or tube, the lower portion of which is of substantial diameter and the upper portion of which is illustrated to be smaller than the lower portion. The lower end of tube 10' is immersed in the water at one side of the boat 11. Preferably it is immersed to a depth greater than the wave height so that the muzzle of the tube will always be below the water surface. The upper end of tube 10' is open to atmosphere.

In the form illustrated three gas sources are provided on the boat 11, being represented by L.P.G. source 20, compressed air source 21 and an oxygen source 22. L.P.G. source 20 is connected by way of valve 23 and flow line 24 to a mixing chamber 25 which encircles the lower end of tube 10'. Flow line 24 terminates in the upper end of the mixing chamber 25. Air from source 21 is supplied by way of valve 26 and flow line 27 to the upper end of the mixing chamber 25. Oxygen may be selectively mixed with air from source 21 by way of valve 28 and flow line 29. Thus L.P.G. and air, and oxygen if desired, are introduced into the upper end of the mixing chamber 25.

A short cylinder 30 extends inside the mixing chamber 25 from the upper end thereof to a point near the bottom so that gas components must flow downwardly through the mixing chamber on the outside of the cylinder 30 and then upward through the annulus between cylinder 30 and tube 10'. Baffles may be provided along said flow path to cause an intermixing of the air and L.P.G. as it flows through the mixing chamber 25. The mixed gas then flows into the lower end of the tube 10' through orifices 31 and then flows upwardly through tube 10' and out to atmosphere at the top.

Preferably, the flow channels 24 and 27 are connected to a plurality of points around the periphery of the mixing chamber 30 in order more readily to commingle and mix the gas components.

An igniter 40 such as a spark plug is mounted in the wall of tube 10' in the region of the upper end thereof and is connected by way of channel 41 to electrical pulser unit 42. Pulser unit 42 is actuated under the control of a switch 43 which is periodically closed by a cam 44. Cam 44 is mounted on shaft 45 of motor 46 which drives a recording element in the recording system 15. In the system illustrated the recording system is of the form of an electrosensitive recorder in which an electrosensitive paper 50 is driven in the direction of arrow 51 in dependence upon time or upon travel of the boat 11. A conductive spiral 52 is mounted on the periphery of insulating cylinder 53 which is driven by motor 46. A writing electrode 54, a knife edge metallic bar positioned parallel and adjacent to the surface of the cylinder 53, is connected to ground terminal. Electrical signals from spread 12 are passed through an amplifying and signal-treating system 55 to a slip ring 56 which is connected electrically to spiral 52. Each signal dependent spark discharge between spiral 52 and electrode 54 causes a visible impression to be made on chart 50 as the contact or contiguous point between spiral 52 and electrode 54 moves across the chart 50. Preferably ignition will be so initiated on each rotation of cam 44 that the wave will strike the surface of the water in the bottom of the tube coincident with registration between the spiral 52 and the upper end of the writing electrode 54. By this means signals from spread 12 will be plotted along a linear time scale across the width of the chart 50. It will be appreciated that other forms of recording systems may be employed to produce a continuous record of subsurface features as boat 11 moves along a selected traverse.

In FIG. 2 a modification of the invention is illustrated in which the component gases, L.P.G. and air, and if desired oxygen, are mixed together and applied to an input conduit 70 which leads to a mixing baffle 71. Baffle 71 has an output conduit 72 which is terminated in an annulus surrounding the bottom of tube 10'. Peripheral entry ports 73 serve to permit entry of the mixed gases into the tube 10 for travel upwardly through the tube. In this system the gases are completely mixed before entry into the annular chamber at the bottom of tube 10'. The mixing baffle in one form comprised a 2' length of pipe about 3" in diameter having six internal baffles such as baffles 74 and 75 which are welded to the curved inner surface of the chamber 71 and extended beyond the central axis thereof. By this means the gases introduced through conduit 70 were required to follow a tortuous path 76 through the chamber 71, intimate mixing of the gas components being accomplished due to the turbulence at the baffle edges.

It was found that tube 10' was satisfactory when made of a 4" diameter tube of the order of 25' in length with the upper portiont hereof reduced to a diameter of from 1" to 2".

Acoustic pulses of uniform energy level and of accurately spaced time intervals as short as 1½ seconds were produced with the system above described.

To initiate operation, gas flow from the propane source may be initially set at a rate of about 12½ gallons per hour with the flow of oxygen at a rate of about 750 cubic feet per hour. The flow of compressed air to be mixed with the above components may be gradually increased while periodically energizing the spark plug. Flow rates at which repetitive and consistent firing takes place may be achieved. It will be appreciated that some variation in the flow rates may be necessary for different tube structure or operating conditions.

While the invention has been described in connection with certain specific embodiments thereof, it will now be understood that further modifications will suggest themselves to those skilled in the art and it is intended to cover such modifications as fall within the scope of the appended claims.

What is claimed is:

1. In combination, means forming an elongated tubular flow channel to be positioned vertically with an upper end thereof open to the atmosphere and a lower end thereof to be coupled to the earth, a plurality of sources of gas components for forming a combustible gas mixture, separate flow channels leading from each of said sources to a point adjacent to the lower end of said elongated flow channel, mixing means connected to said separate flow channels for commingling and mixing said gases to form a combustible gas mixture, means interconnecting said mixing means and said elongated flow channel for introducing said combustible gas mixture into said elongated flow channel at the lower end thereof for substantially continuous flow thereof upwardly through said tube, and means mounted at the upper region of said elongated flow channel for periodically igniting said mixture in the region of said upper end for the production of a combusting wave which travels counter-flow in said gas mixture to impinge earth materials in the region of the lower end thereof.

2. A source of seismic waves for marine areas which comprises an elongated tube having a muzzle end and a breech end and supported with the muzzle end thereof immersed below a water surface and with the breech end thereof open to the atmosphere, an igniter in said tube near the breech end thereof, a plurality of sources of gas components for forming a combustible gas mixture, and means interconnecting said sources and the muzzle end of said tube for commingling and mixing gases from said sources for introduction of a combustible mixture into said tube which upon repeated ignition by said igniter will produce a combustion wave traveling downwardly through said tube.

3. A source of seismic waves for marine areas which comprises an elongated tube having a muzzle end and a breech end and supported with the muzzle end thereof immersed below a water surface and with the breech end thereof open to the atomsphere, an igniter in said tube in the upper end thereof, a plurality of sources of gas components for forming a combustible gas mixture, and flow path means interconnecting said sources and the muzzle end of said tube for repeatedly loading said tube with a combustible mixture which upon repeated ignition by said igniter will produce a combustion wave traveling downwardly through said tube toward said muzzle end.

4. A device for producing seismic impulses comprising an elongated tubular member, said member having at least three serially connected zones including a top combustion zone having an ignition means, an intermediate zone, and a lower immersion zone adapted to be inserted in a body of water or the like, said zone having means connected to a source of fuel.

5. The device of claim 4 wherein said top combustion zone is open to the atmosphere.

References Cited in the file of this patent

UNITED STATES PATENTS

| | | |
|---|---|---|
| 1,500,243 | Hammond | July 8, 1924 |
| 2,353,484 | Merten et al. | July 11, 1944 |
| 2,766,837 | McCollum | Oct. 16, 1956 |
| 2,772,746 | Merten | Dec. 4, 1956 |